(12) United States Patent
Ide (10) Patent No.: US 6,408,618 B2
(45) Date of Patent: Jun. 25, 2002

(54) CONTROLLER FOR CYLINDER CUT-OFF TYPE INTERNAL COMBUSTION ENGINE

(75) Inventor: Yutaka Ide, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/774,630

(22) Filed: Feb. 1, 2001

(30) Foreign Application Priority Data

Feb. 17, 2000  (JP) ........................................ 2000-040003

(51) Int. Cl.⁷ ................................................ F01N 3/00
(52) U.S. Cl. .............................. 60/285; 60/286; 60/276; 123/481; 123/198 F
(58) Field of Search .......................... 60/285, 286, 276, 60/277, 287; 123/481, 198 F (56) References Cited

U.S. PATENT DOCUMENTS

| | | | | |
|---|---|---|---|---|
| 4,134,261 A | * | 1/1979 | Iizuka et al. ................... | 60/276 |
| 4,484,548 A | * | 11/1984 | Sugasawa et al. ....... | 123/198 F |
| 5,056,308 A | * | 10/1991 | Kume et al. ................... | 60/276 |
| 5,417,058 A | * | 5/1995 | Shimizu ...................... | 60/276 |
| 5,447,696 A | * | 9/1995 | Harada ........................ | 60/286 |
| 5,647,207 A | * | 7/1997 | Grotjahn et al. .............. | 60/300 |
| 5,732,680 A | * | 3/1998 | Ninomiya et al. ........... | 123/481 |
| 5,845,492 A | * | 12/1998 | Isobe et al. ..................... | 60/284 |

* cited by examiner

Primary Examiner—Thomas Denion
Assistant Examiner—Binh Tran
(74) Attorney, Agent, or Firm—Arent Fox Kintner Plotkin & Kahn, PLLC (57) ABSTRACT

A controller for a cylinder cut-off type internal combustion engine is provided for ensuring an activated state of catalysts in cylinders, which are stopped during a partial cylinder operation, at all times to maintain favorable emission characteristics upon switching from the partial cylinder operation to a full cylinder operation, and for maintaining a satisfactory fuel consumption rate by conducting the partial cylinder operation to the utmost. The cylinder cut-off type internal combustion engine can be switched between the partial cylinder operation and the full cylinder operation. Exhaust gas from cylinders in a right bank, which are switched off during the partial cylinder operation, and from cylinders in a left bank is purified by two catalyst units in exhaust pipes independent of each other. The controller estimates an estimated catalyst temperature of the catalyst for the right bank, and disables the partial cylinder operation when the estimated catalyst temperature is below a predetermined temperature.

2 Claims, 6 Drawing Sheets

CONTROLLER FOR CYLINDER CUT-OFF TYPE INTERNAL COMBUSTION ENGINE

BACKGROUND OF THE INVENTION

1. Field of the Invention

The present invention relates to a controller for a cylinder cut-off type internal combustion engine which can switch a full cylinder operation which operates all of a plurality of cylinders and a partial cylinder operation which cuts off the operation of some of the plurality of cylinders, and purifies exhaust gas from some cylinders and the remaining cylinders with catalysts provided in two exhaust systems independently of each other.

2. Prior Art

A controller for a cylinder cut-off type internal combustion engine of the type mentioned above is known, for example, in Laid-open Japanese Patent Application No. 8-17742. This cylinder cut-off type internal combustion engine is switched in operation between a full cylinder operation with all of a plurality (six) of cylinders and a partial cylinder operation with some (three) of the plurality of cylinders. The cylinder cut-off type internal combustion engine also comprises exhaust air pipes connected to some cylinders and the remaining cylinders, respectively, catalysts provided respectively in these two exhaust pipes, and a communication pipe for communicating the two exhaust pipes with each other at a location upstream of the catalysts. A valve mechanism is further disposed at a location downstream of the catalyst in the exhaust pipe associated with the remaining cylinders for opening and closing the exhaust pipe.

This controller fully opens the valve during the full-cylinder operation such that exhaust gas from the some cylinders and the remaining cylinders through the respective exhaust pipes. During the partial cylinder operation, on the other hand, the controller reduces the opening of the valve such that a portion of exhaust gas from the remaining cylinders is exhausted through the exhaust pipes of the remaining cylinders, while the remaining portion of the exhaust gas is guided to the exhaust pipes of the some cylinders through the communication pipe, and exhausted therethrough. In this way, the catalysts in the some cylinders are heated by the exhaust gas exhausted from the remaining cylinders to maintain its active state, so that the emission characteristics are maintained in a favorable state when the engine is switched from the partial cylinder operation to the full cylinder operation.

However, the foregoing conventional controller for a cylinder cut-off type internal combustion engine operates the valve even if the catalysts are fully activated, irrespective of the temperature of the catalysts in the some cylinders, causing extra power consumption. Also, a reduced opening of the valve results in a larger exhaust resistance and accordingly a loss of the engine power. As a result, the fuel consumption rate is degraded. Furthermore, the controller requires the communication pipe, the valve, and a mechanism for driving the valve.

OBJECT AND SUMMARY OF THE INVENTION

The present invention has been made to solve the problems mentioned above, and its object is to provide a controller for a cylinder cut-off type internal combustion engine which is capable of ensuring an activated state of catalysts in cylinders, which are stopped during a partial cylinder operation, at all times to maintain favorable emission characteristics upon switching from the partial cylinder operation to a full cylinder operation, and is also capable of maintaining a satisfactory fuel consumption rate by conducting the partial cylinder operation to the utmost.

To achieve the above object, the present invention provides a controller for a cylinder cut-off type internal combustion engine which can be switched between a full cylinder operation in which a plurality of cylinders are all operated and a partial cylinder operation in which some of said plurality of cylinders are prohibited from operating. The cylinder cut-off internal combustion engine adapted to purify exhaust gas from said some cylinders and from the remaining cylinders with first and second catalysts provided respectively in two exhaust systems independent of each other. The controller includes catalyst temperature detecting means for detecting a temperature of said first catalyst, and partial cylinder operation disabling means for disabling said partial cylinder operation when the detected temperature of said first catalyst is lower than a predetermined temperature.

According to this controller for a cylinder cut-off type internal combustion engine, the partial cylinder operation is disabled when the detected temperature of the first catalyst is below the predetermined temperature to transition to the full cylinder operation. As a result, the exhaust gas from the some cylinders and the remaining cylinders is supplied to the first and second catalysts, respectively, thereby making it possible to prevent the temperature of the first catalyst from lowering to the inactive state. Since this ensures the activated state of the first catalyst at all times, favorable emission characteristics can be maintained when the engine is switched from the partial cylinder operation to the full cylinder operation. Also, since the partial cylinder operation is performed unless the temperature of the first catalyst is below the predetermined temperature, a favorable fuel consumption rate can be ensured. It should be noted that in this disclosure, "detection of the temperature of the catalyst" is not limited to directly detecting the temperature of the catalyst with a temperature sensor or the like, but includes estimating the temperature of the catalyst in accordance with an operating state of the cylinder cut-off internal combustion engine.

Preferably, the foregoing controller further includes operating state detecting means for detecting an operating state of said cylinder cut-off type internal combustion engine, wherein said catalyst temperature detecting means includes catalyst temperature estimating means for estimating the temperature of said first catalyst based on the detected operating state.

According to this controller, the temperature of the catalyst can be estimated in software without the need for adding special parts, mechanisms and so on such as a temperature sensor for sensing the temperature of the catalyst, a communication pipe, a valve and a driving mechanism therefor, and so on, which are required in the prior art, thereby making it possible to save the manufacturing cost.

DETAILED DESCRIPTION OF THE PREFERRED EMBODIMENTS

Figure 1:
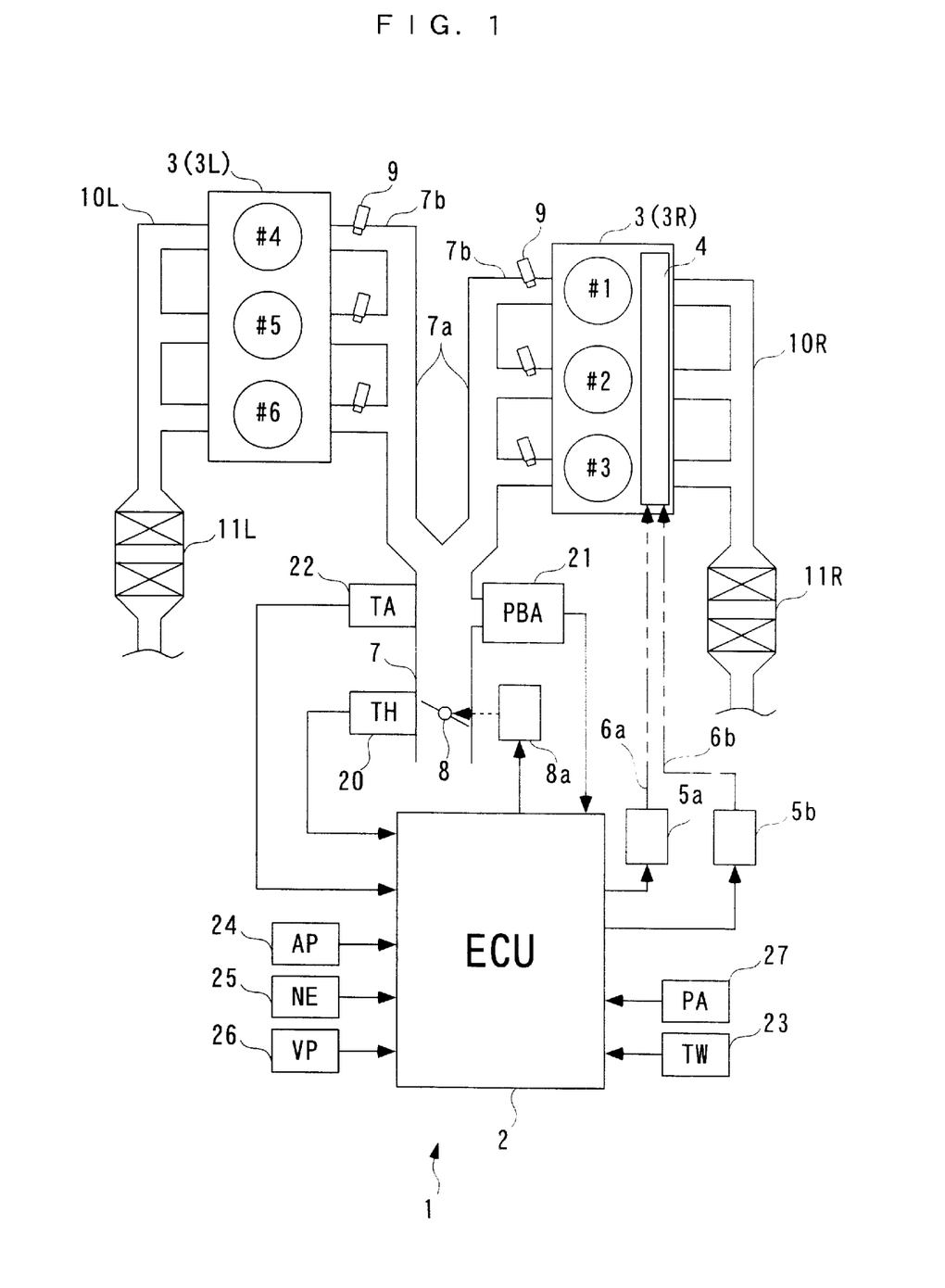
FIG. 1 is a block diagram generally illustrating the configuration of a controller according to one embodiment of the present invention and a cylinder cut-off internal combustion engine in which the controller is applied.

A controller for a cylinder cut-off type internal combustion engine according to one embodiment of the present invention will hereinafter be described with reference to the accompanying drawings. FIG. 1 generally illustrates the configuration of a cylinder cut-off type internal combustion engine and a controller associated therewith according to one embodiment of the present invention. As illustrated, the controller 1 comprises ECU (electronic control unit) 2 which switches the cylinder cut-off internal combustion engine 3 (hereinafter referred to as the "engine 3") in operation between a full cylinder operation and a partial cylinder operation, as will be later described in detail. The ECU 2 implements catalyst temperature determining means, catalyst temperature estimating means, partial cylinder operation disabling means, and an operation state detecting means.

The engine 3 is a V-type six-cylinder DOHC engine which comprises three cylinders #1, #2, #3 (some cylinders) disposed in a right bank 3R, and three cylinders #4, #5, #6 (remaining cylinders) disposed in a left bank 3L. The right bank 3R is also provided with a cylinder switch-off mechanism 4.

The cylinder switch-off mechanism 4 is connected to a hydraulic pump, not shown, through passages 6a, 6b. Also, electromagnetic valves 5a, 5b are disposed between the hydraulic pump and the cylinder switch-off mechanism 4 for an intake valve and an exhaust valve, respectively. These electromagnetic valves 5a, 5b are both normally-closed ones which are electrically connected to the ECU2, such that they open the passages 6a, 6b when they are turned ON by driving signals from the ECU 2. During a partial cylinder operation, the electromagnetic valves 5a, 5b are both turned ON to open the passages 6a, 6b to supply the cylinder switch-off mechanism 4 with a hydraulic pressure from the hydraulic pump. This causes the cylinder switch-off mechanism 4 to release couplings between the intake valve and an intake cam and between the exhaust valve and an exhaust cam (any of which is not shown) in the cylinders #1–#3 in the right bank 3R, thereby bringing the intake valve and the exhaust valve into a drive-free state (closed state).

During a full cylinder operation, on the other hand, the electromagnetic valves 5a, 5b are both turned OFF, contrary to the above, to close the passages 6a, 6b so that the cylinder switch-off mechanism 4 is not supplied with a hydraulic pressure from the hydraulic pump. In this way, the cylinder switch-off mechanism 4 couples between the intake valve and the intake cam and between the exhaust valve and the exhaust cam to bring the intake valve and the exhaust valve into a driving state. The cylinder switch-off mechanism 4 as described above may be configured in a manner similar to that shown, for example, in Japanese Patent Application No. 11-268145.

A throttle valve 8 is disposed in the middle of an intake pipe 7 of the engine 3. An actuator 8a is coupled to the throttle valve 8. The actuator 8a is electrically connected to the ECU 2 such that the actuator 8a is driven by the ECU2 to vary an opening TH of the throttle valve 8 (hereinafter referred to as the "throttle opening TH"). The intake pipe 7 is also provided with a throttle valve opening sensor 20 which detects the throttle valve opening TH and sends a detection signal indicating the same to the ECU 2.

An intake pipe absolute pressure sensor 21 and an intake air temperature sensor 22 are further disposed at locations downstream of the throttle valve 8 in the intake pipe 7. The intake pipe absolute pressure sensor 21 (operating state detecting means), which is comprised of a semiconductor pressure sensor or the like, detects an absolute pressure PBA (a parameter representative of an operating state) within the intake pipe 7, and sends a detection signal indicating the same to the ECU 2. The intake air temperature sensor 22, in turn, is comprised of a thermistor, detects an intake air temperature TA within the intake pipe 7 and sends a detection signal indicating the same to the ECU 2.

The intake pipe 7 is also connected to the six cylinders #1–#6 through an intake manifold 7a, respectively. An injector 9 is disposed at each branch 7b of the intake manifold 7a to face an intake port, not shown, of an associated cylinder. These injectors 9 are driven in response to driving signals from the ECU 2 during the full cylinder operation of the engine 3 to inject a fuel into all the branches 7b. During the partial cylinder operation, in turn, the three injectors 9 associated with the right bank 3R are controlled to refrain from fuel injection.

An exhaust pipe 10R (exhaust system) is connected to the cylinders #1–#3 in the right bank 3R, while an exhaust pipe 10L (exhaust system) is connected to the cylinders #4–#6 in the left bank 3L. These two exhaust pipes 10R, 10L are independent of each other. In the middle of these exhaust pipes 10R, 10L, catalyst units 11R, 11R (first and second catalysts) are disposed respectively for the right bank 3R and the left bank 3L for purifying exhaust gas. These catalyst units 11R, 11L are comprised of a three-way catalyst. However, the catalyst units 11R, 11L are not limited to the three-way catalyst, but may be comprised of a combination of a three-way catalyst and a NOx adsorption catalyst, or the like.

A water temperature sensor 23 comprised of a thermistor or the like is attached to the body (not shown) of the engine 3. The water temperature sensor 23 detects an engine water temperature TW (engine temperature) which is the temperature of a cooling water circulating through a cylinder block of the engine 3, and sends a detection signal indicating the engine water temperature TW to the ECU 2.

An accelerator opening sensor 24, an engine rotational speed sensor 25, a vehicle speed sensor 26, and an atmospheric pressure sensor 27 are connected to the ECU 2. The accelerator opening sensor 24 and the vehicle speed sensor 26 detect a treading amount AP of an accelerator pedal of a vehicle (both not shown) equipped with the engine 3, and a vehicle speed VP, respectively, and send detection signals indicating them to the ECU 2. Similarly, the engine rotational speed sensor 25 (operating state detecting means) and the atmospheric pressure sensor 27 detect an engine rotational speed NE (a parameter representative of an operating state) and an atmospheric pressure, respectively, and send detection signals indicating them to the ECU 2.

The ECU 2 in turn is based on a microprocessor comprised of an I/O interface, a CPU, a RAM, a ROM and so on. The respective detection signals from the aforementioned sensors 20–27 are subjected to A/D conversion and waveform shaping in the I/O interface before they are input to the CPU. The CPU determines an operating state of the engine 3 in accordance with these input signals, and executes catalyst temperature estimation processing for estimating the temperature of the catalyst unit 11R for the right bank 3R in accordance with a control program previously stored in the ROM and data stored in the RAM, as will be later described. The CPU also executes cylinder operation determination processing for determining whether the partial cylinder operation or the full cylinder operation is conducted based on a catalyst temperature TCT estimated in the catalyst temperature estimation processing (hereinafter referred to as the "estimated catalyst temperature TCT").

Next, the catalyst temperature estimation processing for calculating the estimated catalyst temperature TCT will be described with reference to FIG. 2. This processing is executed every predetermined time (for example, every 500 msec) through an interrupt by setting a program timer.

Figure 2:
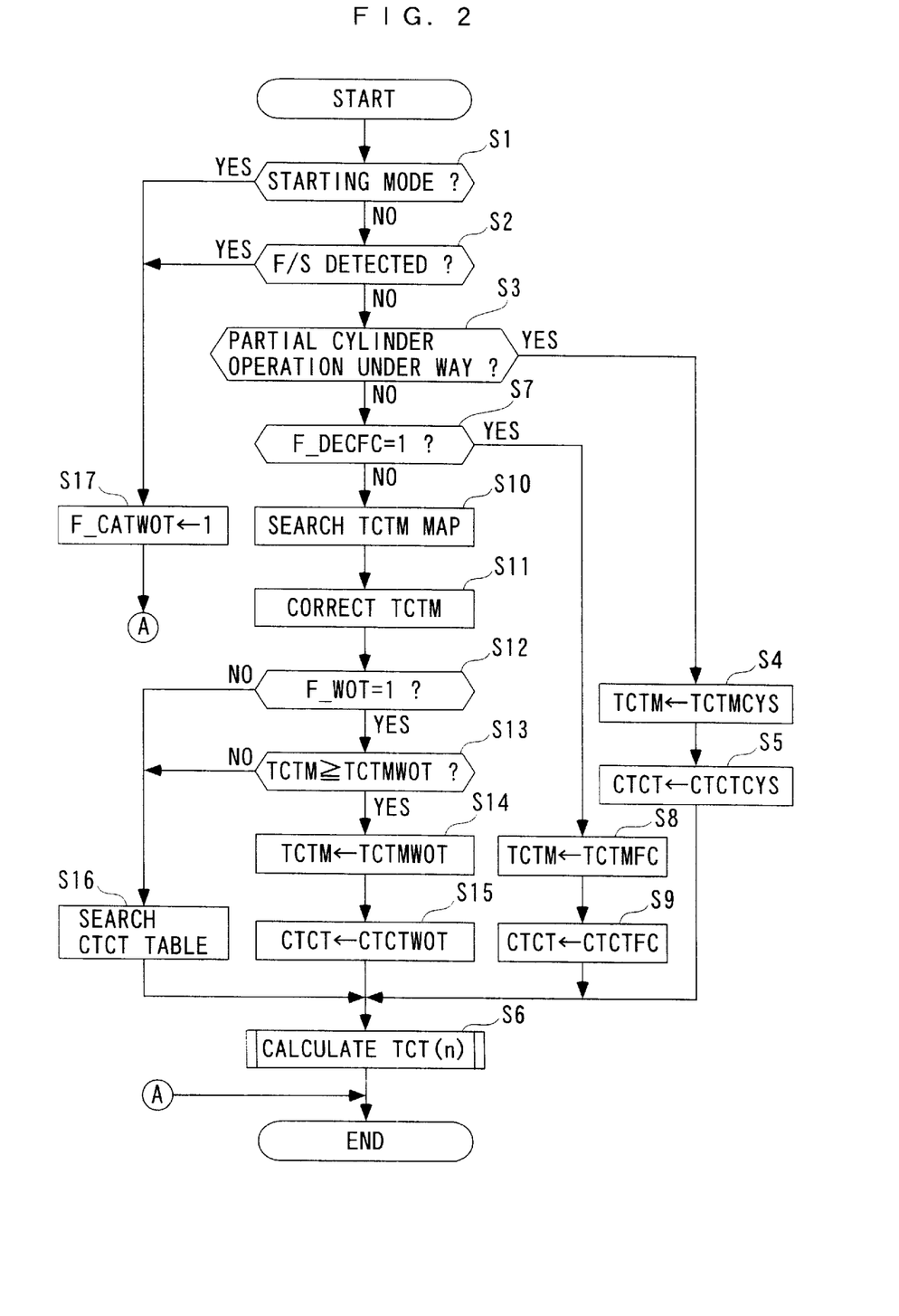
FIG. 2 is a flow chart illustrating an example of catalyst temperature estimation processing.

As illustrated in FIG. 2, the processing first determines whether or not the engine 3 is in a starting mode at step 1 (abbreviated as "S1" in FIG. 2. The same is applied to the following steps) and whether or not fail safe has been detected at step 2. These determinations are made to ascertain that the engine 3 is in a stable operating state in which the temperature of the catalyst unit 11R can be estimated. When the result of the determination at step 1 or step 2 is YES, the processing proceeds to step 17, regarding that the engine 3 is not in a stable operating state in which the temperature of the catalyst unit 11R can be estimated, to set a catalyst temperature determination flag F-CATWOT to "1", followed by termination of the processing.

When the results of the determinations at steps 1 and 2 are both NO, in other words, when the engine 3 is in a stable operating state in which the temperature of the catalyst unit 11R can be estimated, the processing proceeds to step 3 to determine whether or not the engine is in the partial cylinder operation. This determination may be made, for example, by referencing the value of a flag which is set based on open/close states of the electromagnetic valves 5a, 5b.

When the result of the determination at step 3 is YES, i.e., when the engine 3 is in the partial cylinder operation, the processing proceeds to step 4 to derive a map value TCTMCYS for the partial cylinder operation corresponding to the estimated catalyst temperature TCT. This map value TCTMCYS is set as a current map value TCTM for the estimated catalyst temperature TCT. The map value TCTMCYS for the partial cylinder operation is derived based on the engine rotational speed NE and the intake pipe absolute pressure PBA by referring to an estimated catalyst temperature map for the partial cylinder operation, not shown.

Next, the processing proceeds to step 5 to derive a temperature correction coefficient CTCTCYS for the partial cylinder operation which is set as a temperature correction coefficient CTCT. The temperature correction coefficient CTCTCYS for the partial cylinder operation is derived based on the engine rotational speed NE and the intake pipe absolute pressure PBA by referencing a temperature correction coefficient CTCTCYS table for the partial cylinder operation, not shown. In the temperature correction coefficient CTCTCYS table, the temperature correction coefficient CTCTCYS for the partial cylinder operation is set to a larger value as the engine rotational speed NE is higher, and is set to a larger value as the intake pipe absolute pressure PBA is higher.

Next, the processing proceeds to step 6 to calculates a current value TCT(n) for the estimated catalyst temperature TCT in accordance with the following equation using a previous value TCT(n−1) for the estimated catalyst temperature TCT, and the current map value TCTM for the estimated catalyst temperature TCT and the temperature correction coefficient CTCT which have been derived at steps 4, 5, respectively, followed by termination of the processing.

$$TCT(n)=TCT(n-1)+[TCTM-TCT(n-1)]\times CTCT$$

On the other hand, when the result of the determination at step 3 is NO, i.e., when the engine 3 is not in the partial cylinder operation, the processing proceeds to step 7 to determine whether or not a fuel cut flag F_DECFC is "1."

When the result of the determination at step 7 is YES, i.e., when the engine 3 is in a decelerated fuel cut operation (hereinafter referred to as the "F/C operation"), the processing proceeds to step 8 to derive a map value TCTMFC for the F/C operation of the estimated catalyst temperature TCT from the estimated catalyst temperature map and set the value TCTMFC as a current map value TCTM for the estimated catalyst temperature TCT, in a manner similar to the aforementioned step 4.

Next, the processing proceeds to step 9 to derive a temperature correction coefficient CTCTFC for the F/C operation from a temperature correction coefficient CTCTFC table for the F/C operation, and set the temperature correction coefficient CTCTFC as a temperature correction coefficient CTCT, in a manner similar to the aforementioned step 5. Next, the processing proceeds to step 6 to calculate a current value TCT(n) for the estimated catalyst temperature TCT in a manner similar to the above, followed by termination of the processing.

On the other hand, when the result of the determination at step 7 is NO, i.e., when the engine 3 is not in the F/C operation, the processing proceeds to step 10 to derive a current map value TCTM for the estimated catalyst temperature TCT based on the engine rotational speed NE and the intake pipe absolute temperature PBA by referencing a catalyst temperature map, not shown.

Next, the processing proceeds to step 11 to correct the current map value TCTM for the estimated catalyst temperature TCT derived at step 10 based on the atmospheric pressure PA, intake air temperature TA, engine water temperature TW and an ignition time correction amount. More specifically, a correction coefficient KTCTPA and three correction terms DTCTTA, DTCTTW, DTCTIG are derived based on the atmospheric pressure PA, intake air temperature TA, engine water temperature TW and ignition time correction amount by referencing four tables, not shown. Then, the current map value TCTM derived at step 10 is multiplied by the correction coefficient KTCTPA, and the three correction terms DTCTTA, DTCTTW, DTCTIG are added to the resulting product to correct the current map value TCTM. The thus corrected value is set as the current map value TCTM.

Next, it is determined at step 12 whether or not a high load determination flag F_WOT is "1," and at step S13 whether or not the map value TCTM corrected at step 11 is equal to or higher than a predetermined upper limit temperature TCTMWOT. When the result of the determination either at step 12 or at step 13 is NO, i.e., when the engine 3 is not in a high load state or when the estimated catalyst temperature TCT is not higher than the predetermined upper limit temperature TCTMWOT, the processing proceeds to step 16 to derive a temperature correction coefficient CTCT based on the engine rotational speed NE and the intake pipe absolute pressure PBA by referencing the temperature correction coefficient CTCT table in a manner similar to the aforementioned step 5. Next, the processing proceeds to the above step 6 to calculate a current value TCT(n) of the estimated catalyst temperature TCT, followed by termination of the processing.

On the other hand, when the results of the determinations at steps 12 and 13 are both YES, i.e., when the engine 3 is in a high load and high temperature state, the current map value TCTM is set to the upper limit temperature TCTMWOT, and the temperature correction coefficient CTCT is set to a predetermined value CTCTWOT (steps 14, 15). Then, the process proceeds to the above step 6 to calculate a current value TCT(n) of the estimated catalyst temperature TCT, followed by termination of the processing.

Figure 3:
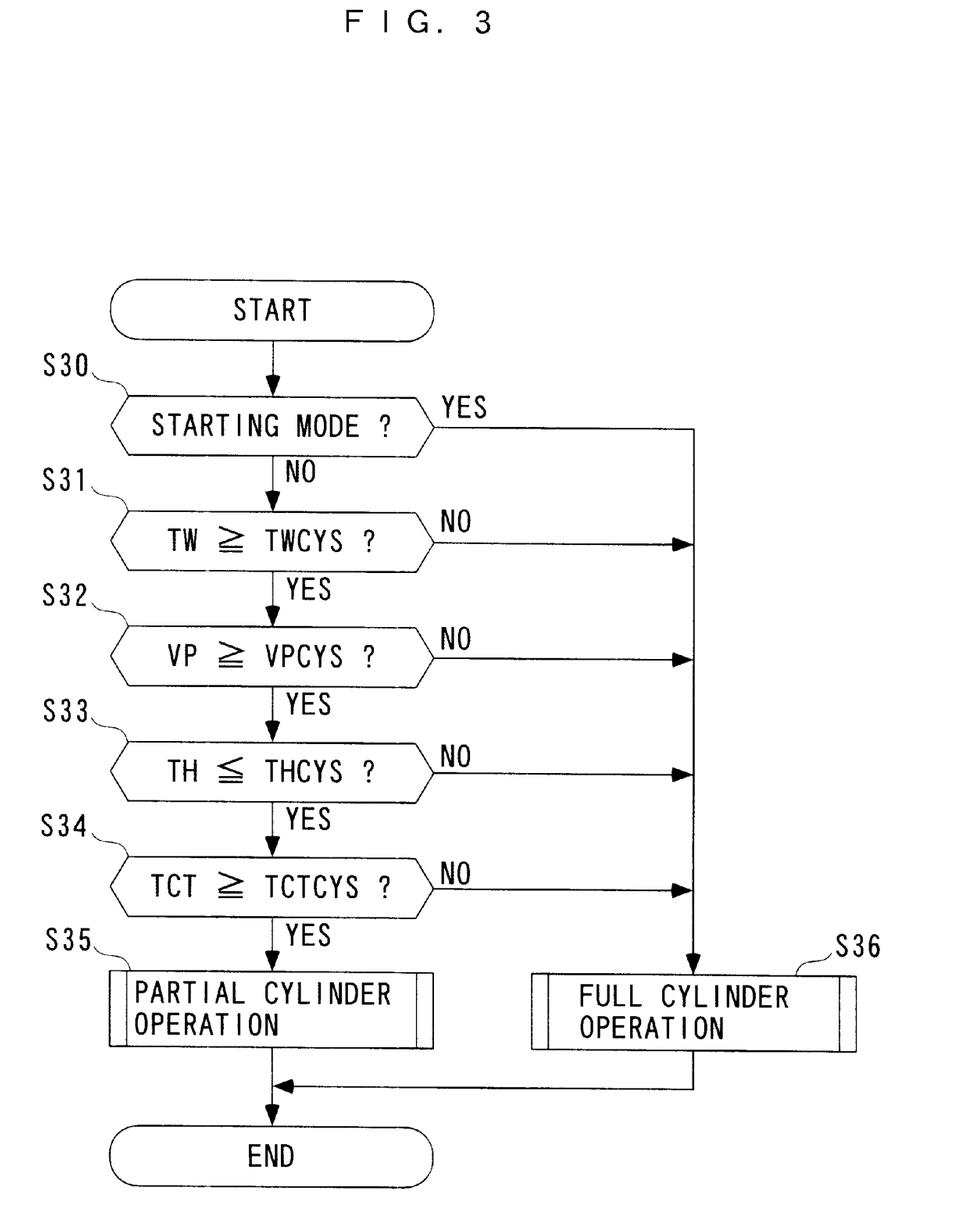
FIG. 3 is a flow chart illustrating an example of cylinder operation determination processing.

Next, description will be made on cylinder operation determination processing for determining whether the partial cylinder operation or the full cylinder operation is to perform based on the estimated catalyst temperature TCT calculated by the foregoing catalyst temperature estimation processing. FIG. 3 is a flow chart illustrating an example of the cylinder operation determination processing. This processing is executed every predetermined time (for example, every 10 msec) through an interrupt by setting the program timer.

In this processing, it is determined at steps 30–33, later described, whether or not a cylinder switch-off condition is established, i.e., whether or not the engine 3 is in a stable operating state in which the partial cylinder operation can be performed. Specifically, at step 30, it is determined whether or not the engine 3 is in a starting mode.

When the engine is not in the starting mode as determined at step 30, the processing proceeds to step 31 to determine whether or not the engine water temperature TW is equal to or higher than a predetermined temperature TWCYS (for example, 50° C.). This predetermined temperature TWCYS is set to provide hysteresis of a predetermined width in order to prevent the control from hunting due to frequent changes in the result of the determination at step 30.

When TW≧TWCYS at step 31, the processing proceeds to step 32 to determine whether or not the vehicle speed VP is equal to or higher than a predetermined speed VPCYS (for example, 15 km/h). This predetermined speed VPCYS is also set to provide hysteresis of a predetermined width in order to prevent the hunting, as is the case of the predetermined temperature TWCYS.

When VP≧VPCYS at step 32, the processing proceeds to step 33 to determine whether or not the throttle valve opening TH is equal to or larger than a predetermined opening THCYS (for example, 2°) with hysteresis.

When TH≦THCYS at step 33, i.e., when it is determined at the foregoing steps 30–33 that the engine 3 is in a stable operating state in which the partial cylinder operation can be performed, and therefore the cylinder switch-off condition is established, the processing proceeds to step 34 to determine whether or not the estimated catalyst temperature TCT is equal to or higher than a predetermined temperature TCT-CYS.

This predetermined temperature TCTCYS is set to a value (for example, 350° C.) such that the catalyst unit 11R is assumed to be in an activated state without fail when the estimated catalyst temperature TCT is at or above this value. In addition, like the throttle valve opening TH and so on, the predetermined temperature TCTCYS is set to provide hysteresis of a predetermined width (the width between an upper limit value TCTCYS (HIGH) and a lower limit value TCTCYS (LOW) shown in FIG. 4) for preventing the hunting.

When TCT≧TCTCYS at step 34, i.e., when the catalyst unit 11R is assumed to be in the activated state without fail, the processing proceeds to step 35 to execute the partial cylinder operation, followed by termination of the processing. In this event, when the partial cylinder operation has been performed in the preceding loop, the partial cylinder operation is continued as it is. On the other hand, when a transition is made from the full cylinder operation to the partial cylinder operation in the current loop, a switch-off control is conducted for controlling the transition from the full cylinder operation to the partial cylinder operation, as described later.

On the other hand, when the result of the determination at step 30 is YES, or when the result of the determination at either of steps 31–34 is NO, i.e., when the engine 3 is in an unstable operating state in which the partial cylinder operation cannot be performed, or when the catalyst unit 11R is assumed to be in an inactive state, the processing proceeds to step 36 to perform the full cylinder operation (disable the partial cylinder operation), followed by termination of the processing. In this event, when the full cylinder operation has been performed in the preceding loop, the full cylinder operation is continued as it is. On the other hand, when a transition is made from the partial cylinder operation to the full cylinder operation in the current loop, a recovery control is conducted for controlling the transition from the partial cylinder operation to the full cylinder operation, as described later.

Figure 4:
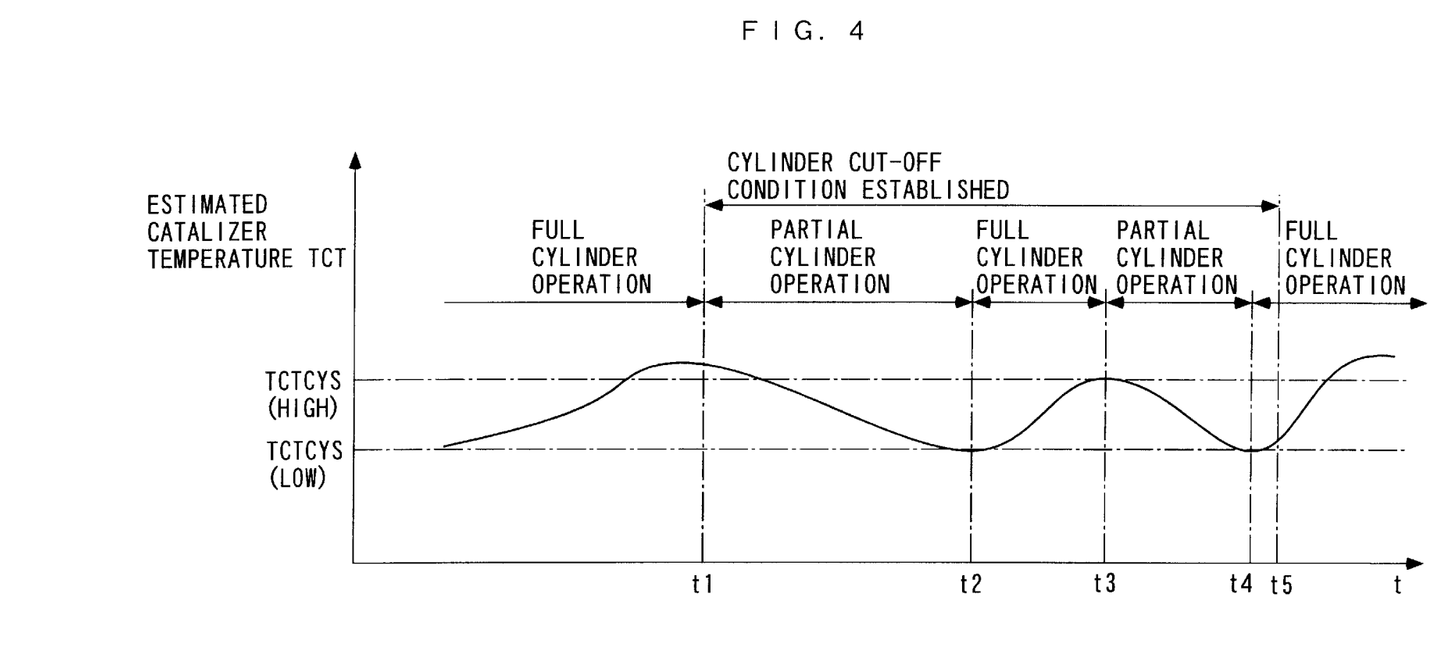
FIG. 4 is a timing chart showing an example of how an estimated catalyst temperature changes when the cylinder operation determination processing is performed.

FIG. 4 shows an example of how the estimated catalyst temperature TCT changes when the cylinder operation determination processing is performed as described above. As illustrated, while the cylinder switch-off condition is not established at steps 30–33 (up to time t1), the full cylinder operation is performed. Then, at the time (time t1) the cylinder switch-off condition is established, the partial cylinder operation is started due to the fact that the estimated catalyst temperature TCT is equal to or higher than the upper limit value TCTCYS(HIGH). Then, if the estimated catalyst temperature TCT becomes lower than the lower limit value TCTCYS(LOW) due to the partial cylinder operation (at time t2), the partial cylinder operation is disabled and the full cylinder operation is performed instead, even while the cylinder switch-off condition remains established (a period from time t1 to time t5).

Next, when the performance of the full cylinder operation causes the estimated catalyst temperature TCT to increase to the upper limit value TCTCYS(HIGH) or higher (at time t3), the partial cylinder operation is resumed. Subsequently, when the performance of the partial cylinder operation causes the estimated catalyst temperature TCT to again decrease below the lower limit value TCTCYS(LOW) (at time t4), the partial cylinder operation is disabled, and the full cylinder operation is performed instead, in a manner similar to the above.

Figure 5:
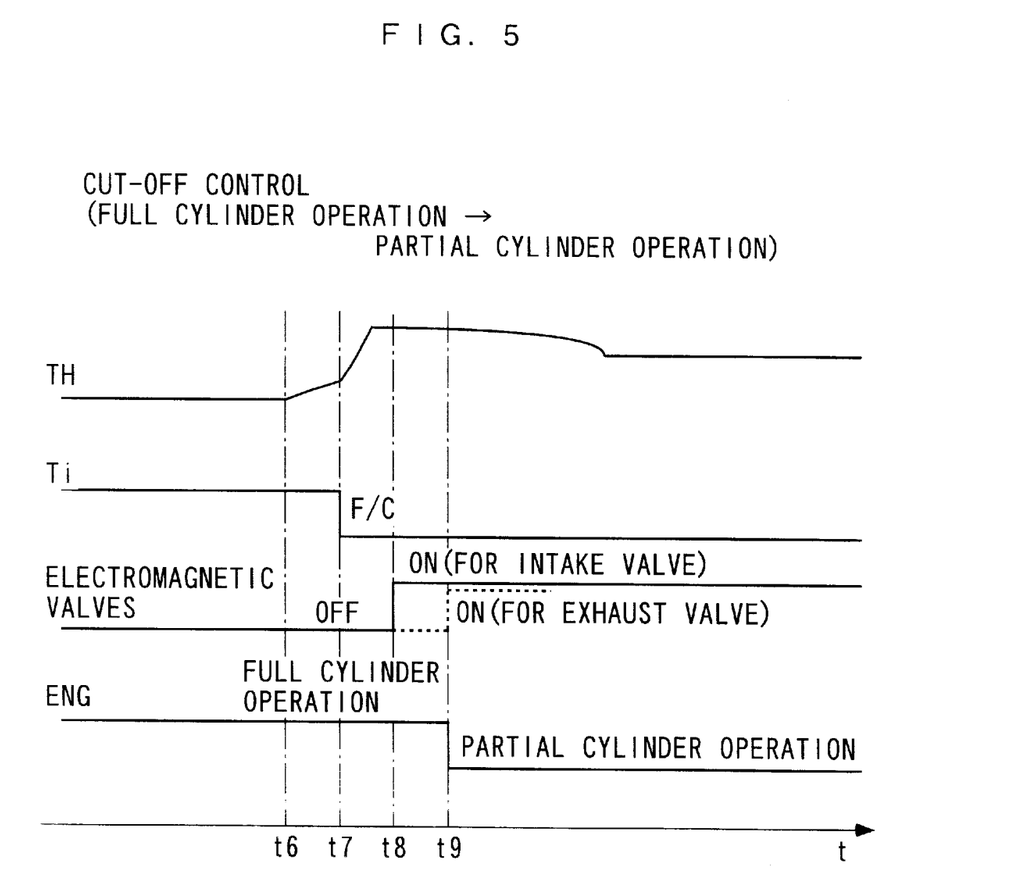
FIG. 5 is a timing chart for explaining a switch-off control.
Figure 6:
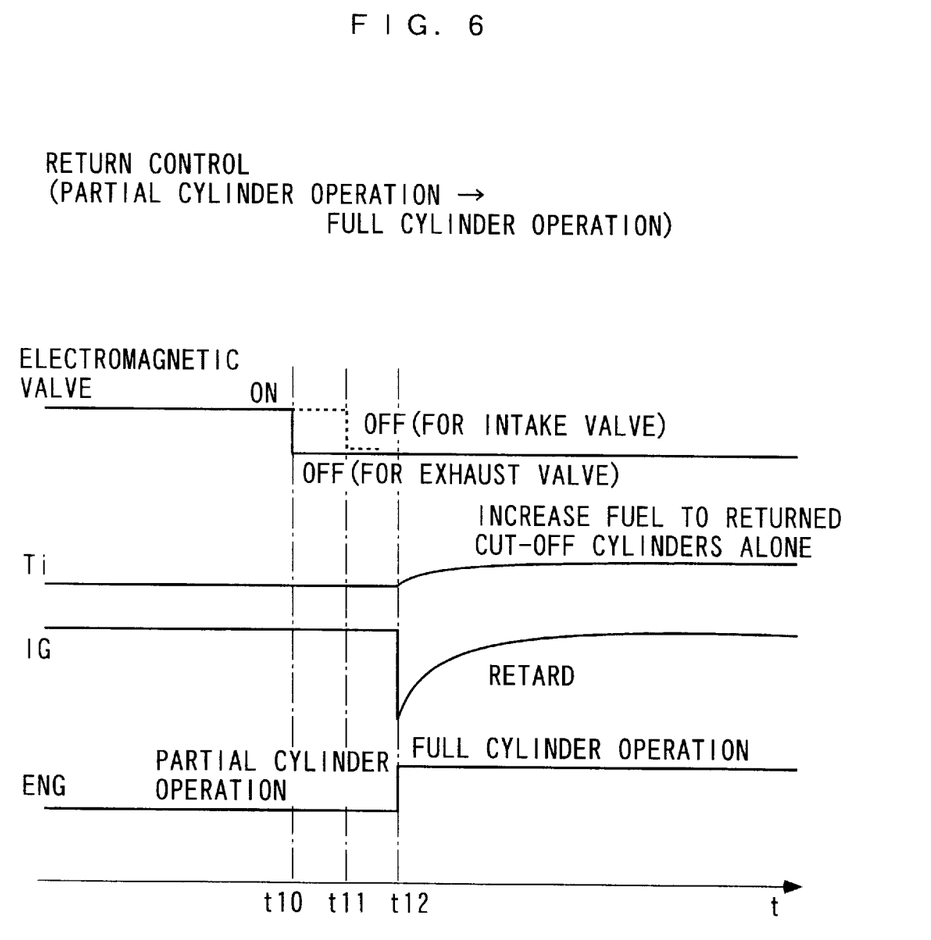
FIG. 6 is a timing chart for explaining a recovery control.

Referring next to FIGS. 5 and 6, description will be made on the switch-off control for controlling a transition from the full cylinder operation to the partial cylinder operation and the recovery control for controlling a transition from the partial cylinder operation to the full cylinder operation. Specifically, these switch-off control and recovery control may be conducted in a manner similar to a switch-off control method and a recovery control method shown in Japanese Patent Application No. 11-268145 by driving the electromagnetic valves 5a, 5b for the intake valve and the exhaust valve, cylinder switch-off mechanism, injectors 9, and ignition plugs, not shown.

As illustrated in FIG. 5, the switch-off control begins with an operation for increasing the throttle valve opening TH during the full cylinder operation (at time t6). Next, at a later timing (t7), a basic fuel injecting time Ti is set to zero for the injectors 9 in the cylinders #1–#3 in the right bank 3R to start an F/C operation. Then, at a timing later than the timing at which the F/C operation was started (at time t7), the throttle valve opening TH begins to be gradually decreased. Next, at a later timing (time t8), the electromagnetic valve 5a for the intake valve is turned ON to switch off the intake value associated with the cylinders #1–#3 in the right bank 3R.

Next, at a timing (time t9) later than the timing (time t8) at which the electromagnetic valve 5a for the intake valve was turned ON, the electromagnetic valve 5b for the exhaust valve is turned ON to switch off the exhaust valve associated with the cylinders #1–#3 in the right bank 3R. Then, at a timing later than the timing (time t9) at which the electromagnetic valve 5b for the exhaust valve was turned ON, the gradual decrease of the throttle valve opening TH is ended and maintained constant. In the foregoing manner, the cylinders #1–#3 in the right bank 3R are switched off to complete a transition from the full cylinder operation to the partial cylinder operation. By thus controlling the throttle valve opening TH, a step-like torque difference can be prevented when a transition is made from the full cylinder operation to the partial cylinder operation. Also, the timings at which the intake valve and the exhaust valve are switched off with respect to the timing at which the F/C operation is started, as described above, are determined by correcting two delay times determined by the engine rotational speed NE with an oil temperature, in a manner similar to a control method shown in the above-cited Japanese Patent Application No. 11-268145. In this way, favorable emission characteristics can be maintained when a transition is made from the full cylinder operation to the partial cylinder operation.

On the other hand, in the recovery control, the electromagnetic valve 5b for the exhaust valve is first turned OFF (at time t10) during the partial cylinder operation to recover the exhaust valve associated with the cylinders #1–#3 in the right bank 3R to a movable state. Next, at a timing (time t11) later than the timing (time t5) at which the electromagnetic valve 5b for the exhaust valve was turned OFF, the electromagnetic valve 5a is turned OFF to recover the intake valve associated with the cylinders #1–#3 in the right bank 3R to a movable state. Subsequently, at a timing (time t12) later than the timing (time t11) at which the intake valve returns to operate, an ignition time IG in all the cylinders #1–#6 is retarded, for example, by an angle calculated in accordance with the operating state. Simultaneously, a basic fuel injection time Ti for the fuel injection time TOUT in the cylinders #1–#3 in the right bank 3R is set larger than that in the cylinders #4–#6 in the left bank 3L. In other words, the among of fuel supplied to the cylinders #1–#3 in the right bank 3R is increased.

Subsequently (after time t12), the ignition timing IG is gradually advanced, while the cylinders #1–#3 in the right bank 3R are supplied with a gradually increased amount of fuel. In the foregoing manner, the operation of the cylinders #1–#3 in the right bank 3R are resumed to complete the transition from the partial cylinder operation to the full cylinder operation. The ignition timing IG and the basic fuel injection time Ti controlled as described above can prevent a step-like torque difference from occurring when a transition is made from the partial cylinder operation to the full cylinder operation. In addition, the timing at which the exhaust valve returns to operate and the timing at which the ignition timing is retarded, with respect to the timing at which the intake valve returns to operate, are also determined by correcting two delay times determined by the engine rotational speed NE with an oil pressure and an oil temperature, as is the case of the switch-off timing. In this way, favorable emission characteristics can be maintained when a transition is made from the partial cylinder operation to the full cylinder operation.

As described above, according to the controller 1 of this embodiment, the partial cylinder operation is disabled when the estimated catalyst temperature TCT of the catalyst unit 11R for the cylinders #1–#3 in the right bank 3R is lower than the lower limit value TCTCYS(LOW) of the predetermined temperature TCTCYS to perform the full cylinder operation. In this way, exhaust gas from the cylinders #1–#3 in the right bank 3R and from the cylinders #4–#6 in the left bank 3L is supplied to the catalyst units 11R, 11L for the right bank 3R and the left bank 3L, respectively, thereby making it possible to prevent the temperature of the catalyst unit 11R for the right bank 3R from lowering to an inactive state. As a result, the catalyst unit 11R for the right bank 3R can be ensured in an activated state at all times, so that the favorable emission characteristics can be maintained upon a transition from the partial cylinder operation to the full cylinder operation.

Also, when the cylinder switch-off condition has been established, the partial cylinder operation is performed unless the estimated catalyst temperature TCT of the catalyst unit 11R is below the lower limit value TCTCYS(LOW) of the predetermined temperature TCTCYS, so that a favorable fuel consumption rate can be ensured. Further, since the estimated catalyst temperature can be derived by a control program (in software) without using special parts, mechanism and so on such as a temperature sensor for detecting the temperature of the catalyst, a communication pipe, a valve mechanism and so on which have been required in the prior art, thereby making it possible to save the manufacturing cost.

While the foregoing embodiment estimates the temperature of the catalyst unit 11R for the right bank 3R by means of a control program, a temperature sensor may be used instead to directly detect the temperature of the catalyst unit 11R.

As described above, according to the controller for a cylinder cut-off internal combustion engine of the present invention, a catalyst for cylinders which are switched off during a partial cylinder operation can be ensured in an activated state at all time, so that the emission characteristics can be maintained favorably when an engine is switched from a partial cylinder operation to a full cylinder operation. In addition, since the partial cylinder operation is performed to the utmost, a favorable fuel consumption rate can be ensured.

What is claimed is:

1. A controller for a cylinder cut-off type internal combustion engine which is switched between a full cylinder operation in which a plurality of cylinders are all operated and a partial cylinder operation in which some of said plurality of cylinders are prohibited from operating, said cylinder cut-off internal combustion engine having first and second catalysts provided respectively in two exhaust systems independent of each other for purifying exhaust gas from said some cylinders and from the remaining cylinders respectively, said controller comprising:

catalyst temperature detecting means for detecting a temperature of said first catalyst; and partial cylinder operation disabling means for disabling said partial cylinder operation when the detected temperature of said first catalyst is lower than a predetermined temperature.

2. A controller for a cylinder cut-off type internal combustion engine according to claim 1, further comprising:

operating state detecting means for detecting an operating state of said cylinder cut-off type internal combustion engine, wherein said catalyst temperature detecting means includes catalyst temperature estimating means for estimating the temperature of said first catalyst based on the detected operating state.

* * * * *